United States Patent [19]
Ejima

[11] Patent Number: 5,920,348
[45] Date of Patent: Jul. 6, 1999

[54] ELECTRONIC CAMERA WITH ADJUSTABLE IMAGE READOUT AREA

[75] Inventor: Satoshi Ejima, Tokyo, Japan

[73] Assignee: Nikon Corporation, Tokyo, Japan

[21] Appl. No.: 08/947,101

[22] Filed: Oct. 8, 1997

Related U.S. Application Data

[63] Continuation of application No. 08/675,971, Jul. 5, 1996, abandoned, which is a continuation of application No. 08/369,769, Jan. 6, 1995, abandoned, which is a continuation of application No. 08/283,747, Aug. 1, 1994, abandoned, which is a continuation of application No. 08/015,904, Feb. 10, 1993, abandoned.

[30] Foreign Application Priority Data

Feb. 18, 1992 [JP] Japan ........................................ 4-60979

[51] Int. Cl.$^6$ ..................................................... H04N 5/225
[52] U.S. Cl. ............................................ 348/341; 348/333
[58] Field of Search .................................... 348/207, 333, 348/341, 319, 320, 321, 322, 323, 324; 396/311

[56] References Cited

U.S. PATENT DOCUMENTS

| | | | |
|---|---|---|---|
| 4,478,493 | 10/1984 | Yokota | 359/41 |
| 4,539,598 | 9/1985 | Dietrich et al. | 348/319 |
| 4,786,987 | 11/1988 | Fujimura et al. | 360/35.1 |
| 4,843,475 | 6/1989 | Imai | 348/358 |
| 4,924,247 | 5/1990 | Suzuki et al. | 354/164 |
| 4,978,983 | 12/1990 | StÅlfors | 354/76 |
| 5,067,020 | 11/1991 | Funston | 348/112 |
| 5,161,025 | 11/1992 | Nakao | 358/224 |
| 5,196,939 | 3/1993 | Elabd et al. | 348/314 |
| 5,216,457 | 6/1993 | Yamaguchi et al. | 396/377 |
| 5,319,403 | 6/1994 | Sakamoto et al. | 354/106 |

FOREIGN PATENT DOCUMENTS

| | | |
|---|---|---|
| 3921983 | 1/1990 | Germany . |
| 2-97928 | 4/1990 | Japan . |
| 3-292067 | 12/1991 | Japan . |

OTHER PUBLICATIONS

Patent Abstracts of Japan, vol. 14, No. 303 (p–1070), Jun. 29, 1990.
Patent Abstracts of Japan, vol. 12, No. 385 (E–668), Oct. 14, 1988.

Primary Examiner—Wendy Garber
Assistant Examiner—Jacqueline Wilson
Attorney, Agent, or Firm—Shapiro and Shapiro

[57] ABSTRACT

An electronic camera having an image sensor to receive the light rays of an object and convert them into the electrical image signals comprises an optical finder capable of varying its enlarging magnification or photographing area; a reading device to read the signals of a part of the area of the image the rays of which are received by the image sensor; a reading area modifying device to modify the size of the area read from the image sensor in accordance with the enlarging magnification of the finder or the displayed photographing area. Further, such an electronic camera comprises a metering device to measure the distance between an object and the taking lens, and the reading area modifying device modifies the size and position of the area read from the image sensor in accordance with the finder magnification or the displayed photographing area and the measured value by the metering device.

22 Claims, 8 Drawing Sheets

ELECTRONIC CAMERA WITH ADJUSTABLE IMAGE READOUT AREA

This is a continuation of application Ser. No. 08/675,971 filed Jul. 5, 1996, which is a continuation of application Ser. No. 08/369,769 filed Jan. 6, 1995, which is a continuation of application Ser. No. 08/283,747 filed Aug. 1, 1994, which is a continuation of application Ser. No. 08/015,904 filed Feb. 10, 1993, all now abandoned.

BACKGROUND OF THE INVENTION

1. Field of the Invention

The present invention relates to an electronic camera which converts the light from an object into electrical image signals to record them on a recording medium.

2. Related Background Art

The structure of a conventional electronic camera is shown in FIG. 6. The conventional electronic camera 61 comprises a zoom lens 62 which is an image magnification variable taking lens, an optical zoom finder 3 of a variable enlarging magnification type, an image sensor 4 to receive the light rays from an object and convert them into electrical image signals, a recording medium 6 to record the foregoing image signals, a metering device 7 to measure the distance between the object and the camera, a zooming lever 8 to vary the image magnification of the zoom lens 62 and the enlarging magnification of the zoom finder 3, and a control device 5. In FIG. 6, reference numeral 10 designates an object and 11 designates a photographer.

The conventional electronic camera 61 thus structured performs its photographing operations set forth below. The photographer 11 observes the object 10 through the zoom finder to operate the zooming lever 8 to set a desired image magnification. When the zooming lever 8 is held down to the left in FIG. 6, a switch SW1 is turned on. The zoom finder 3 is driven by a driving device which is not shown to shift a member 3a of its optical system thereby to enlarge the object image in a given frame of a field. Hence, the enlarging magnification is increased. A member 62a of the optical system in the zoom lens 62 is interlocked with the zooming operation of the foregoing finder 3. It is thus shifted to cause its image magnification to be increased in proportion to the image magnification of the zoom finder 3. The size of the object image occupying the light receiving area of the image sensor 4 is increased accordingly.

When the zooming lever 8 is held down to the right in FIG. 6, a switch SW2 is turned on. The zoom finder is driven by a driving device which is not shown to shift member 3a of its optical system in the direction opposite to the foregoing operation thereby to reduce the enlarging magnification of the zoom finder 3. At the same time, the member 62a of the optical system in the zoom lens 62 is interlocked with this operation. It is thus shifted to decrease its image magnification in proportion to the image magnification of the zoom finder 3.

As described above, the operation is performed so that the ratio between the object image observed by the photographer 11 through the finder 3 and the field frame, and the ratio between the object image projected on the image sensor 4 and the light receiving area of the image sensor can be equal.

Then, when the photographer depresses a release button (not shown), a metering device 7 is caused to measure the distance between the camera and the object. A member of the optical system of the zoom lens 62 is driven by a driving device which is not shown in accordance with such a measured value to allow the object image to be imaged on the image sensor 4. Thus, the image information on the foregoing image sensor 4 is recorded on a recording medium 6.

FIG. 7 and FIGS. 8A and 8B are views showing another example of the prior art. As shown in FIG. 7, an electronic camera 71 comprises a taking lens 72, a finder CRT 73, an image sensor 4, a control device 5, a recording medium 6, a metering device 7, a zooming lever 8, and an image memory 9. A reference numeral 10 designates an object, and 11 designates a photographer. FIG. 8A illustrates an image displayed on the finder CRT. FIG. 8B illustrates an image formed on the image sensor 4. Here, the image B formed on the image sensor is reversed due to the optical effect of the taking lens.

In the photographing operation of this electronic camera, when the photographer turns on a power source of the camera by a power source switch which is not shown, the distance between the camera and the object is measured by the metering device 7. Then, in accordance with the metered information, a member 72b of the optical system of the taking lens 72 is driven by a driving device which is not shown to enable the object image to be focused on the image sensor 4. The image sensor 4 converts the optical information into electrical signals to record them in the image memory 9. The signals inputted into the image memory 9 are read to be displayed on the finder CRT 73.

The photographer 11 observes the object image displayed on the finder CRT 73 and operates the zooming lever 8 to set a desired photographing magnification. When this zooming lever 8 is held down to the left in FIG. 7, a switch SW1 is turned on, and while referring to the images shown in FIGS. 8A and 8B, an area C in the image B formed on the image sensor 4 is enlarged by the image memory. This enlarged image is displayed on the finder CRT 73. Then, the foregoing area C is further narrowed by the operation of the zooming lever 8. Thus, it is possible to increase the enlarging magnification still more.

When the zooming lever 8 is held down to the right in FIG. 7, a switch SW2 is turned on. Then, the area C shown in FIG. 8B is enlarged to an area designated by a reference mark B. The photographing magnification becomes small, and this image is displayed on the finder CRT 73.

This electronic camera 71 according to the prior art is capable of varying the enlarging magnification of an object electrically with the operations described above, and when a release button which is not shown is depressed, the control device 5 is driven to record the image displayed on the finder CRT 73 in the recording medium 6.

In the conventional electronic cameras described above, problems are encountered as set forth below. In the electronic camera 61 shown in FIG. 6, it is required to mechanically interlock and drive the two optical members having different shifting distance, namely, the optical member 62a in the zoom lens 62 and the optical member 3a in the zoom finder 3. Thus, there is a problem that the mechanism of the camera becomes inevitably complicated.

Furthermore, if the photographing magnification is great and the distance to an object is short, so-called parallax occurs. This is a phenomenon whereby a deviation takes place between an object visualized in a finder and the actual object to be photographed. This phenomenon is caused by a deviation between the optical center of a zoom lens and the optical center of a zoom finder.

With reference to FIG. 6 this phenomenon will be described. As shown in FIG. 6, there is an object 10 on the extension of the optical axis P1 of the zoom finder 3. Therefore, the object 10 is observed in the center of the zoom finder 3. However, since no object is present on the optical axis Q of the zoom lens 62, the object 10 is not imaged in the center of the image sensor 4 but is imaged in a position away from the center of the image sensor by a distance x. As a result, any image taken by this camera 61 differs from the image desired by the photographer 11 when visualized through the finder 3.

In the conventional electronic camera shown in FIG. 7, there is no need for the two optical members, the zoom lens and zoom finder, to be interlocked as in FIG. 6. Also, no deviation takes place between the optical axis of the finder and the optical axis of the taking lens. There is no possibility that any parallax is generated at all.

However, in the foregoing electronic camera, the finder CRT 73 and image sensor 4 are constantly energized while the photographer 11 observes the finder 73. Consequently, it is necessary to provide a battery of a large capacity, not only making it necessary to make the camera large, but also increasing the manufacturing cost of the camera due to the provision of the aforesaid CRT 73.

SUMMARY OF THE INVENTION

The present invention is designed with a view to solving the above-mentioned problems in the conventional electronic cameras. It is an object of the invention to provide a small electronic camera of a simple structure which consumes only a small amount of power and avoids any parallax.

According to the present invention, an electronic camera having an image sensor which receives the rays of light from an object and converts them into the electrical image signals may comprise an optical finder for observing an object image;

a photographing area modifying device for modifying the photographing area for the image of an object to be photographed which is observable through the optical finder;

a reading device for reading the signals in a part of the area for the image received by the image sensor;

a recording device for recording the signals thus read by the reading device; and a reading area modifying device for modifying the size of the area in which the signals from the image sensor are read in accordance with the photographing area modified by the photographing area modifying device.

The aforesaid photographing area modifying device may comprise a finder magnification modifying device which modifies the area to be photographed by changing the enlarging magnification of the optical finder.

The aforesaid reading area modifying device is capable of modifying the size of the area to be read from the image sensor in accordance with the enlarging magnification by the finder magnification modifying device.

The electronic camera is provided with a taking lens to image the object image on the image sensor, and a metering device for measuring the distance between the electronic camera and the object, and the reading area modifying device is capable of modifying the size and position of the area from which to read out the signals of the image sensor in accordance with the enlarging magnification by the aforesaid finder magnification modifying device and the measured value by the aforesaid metering device.

Furthermore, for an electronic camera according to another aspect of the present invention, the photographing area modifying device may include a photographing area displaying device which displays the photographing area in the object image observable through the optical finder, and a display modifying device which modifies the display area of the photographing area displaying device.

The aforesaid reading area modifying device is capable of changing the size of the area from which to read out the signals of the image sensor in accordance with the display area of the display modifying device.

The electronic camera further includes a taking lens to image the aforesaid object image on the aforesaid image sensor, and a metering device for measuring the distance between the object and the electronic camera, and the reading area modifying device is capable of changing the size and position of the area from which to read out the signals of the aforesaid image sensor in accordance with the display area by the finder display modifying device and the measured value by the metering device.

According to one principal advantage of the present invention, an object can be enlarged electronically by the aforesaid reading area modifying device which may read a part of the light receiving area of the image sensor such that a photographing magnification corresponds to the enlarging magnification of the optical finder. As a result, there is no need for any provision of a mechanism to interlock two optical members, the zoom lens and zoom finder, making it possible to implement the miniaturization of the camera.

According to another principal advantage of the present invention, it is possible to prevent any generation of parallax by using the reading area modifying device which may change not only the size of the reading area for the image sensor, but also the position thereof in accordance with the enlarging magnification of the finder and the measured value by the metering device as well.

DETAILED DESCRIPTION OF THE PREFERRED EMBODIMENTS

Hereinafter, the description will be made of the present invention specifically in accordance with the preferred embodiments thereof, but it is to be understood that the present invention is not limited to such embodiments.

Figure 1:
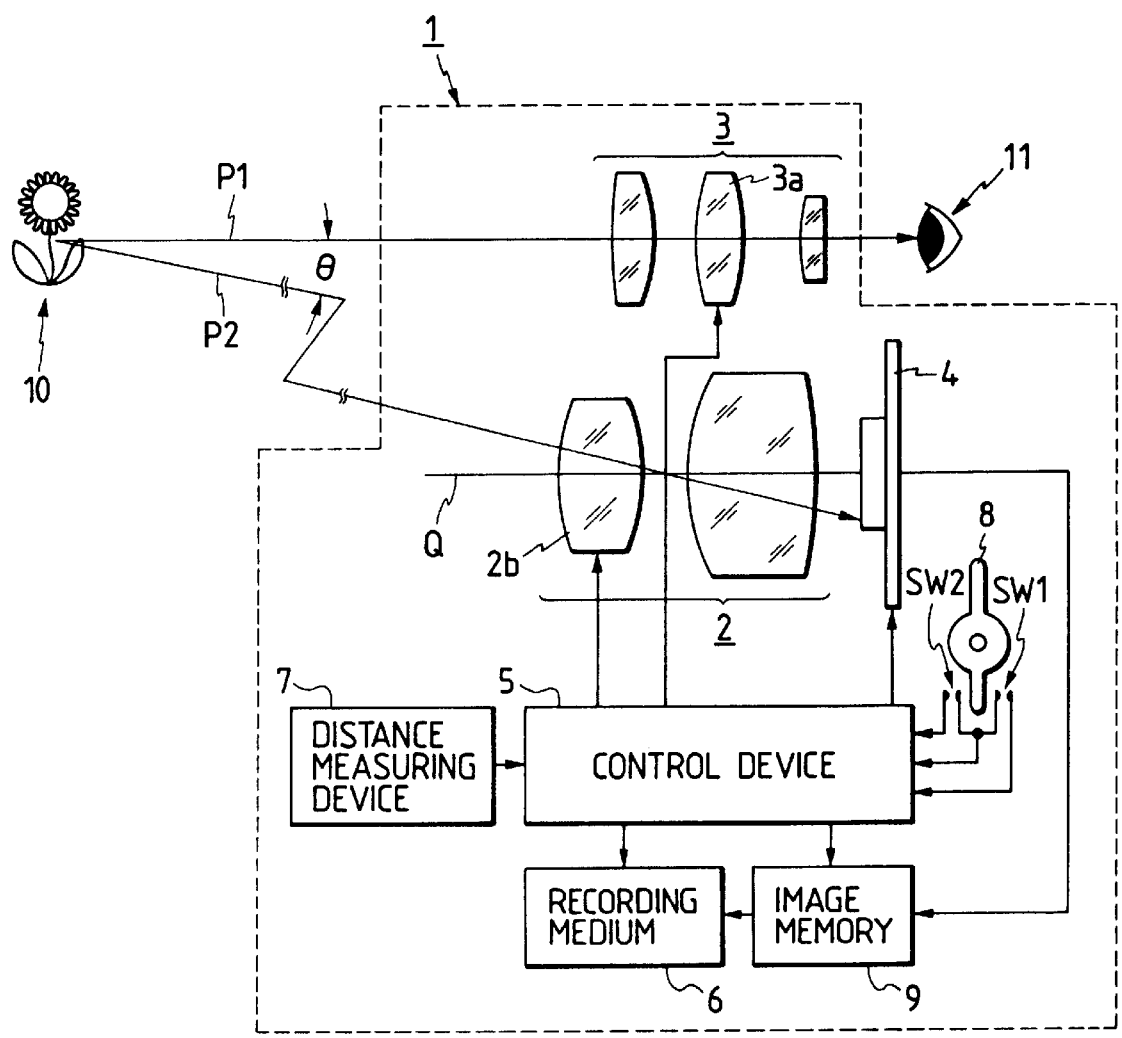
FIG. 1 is a view schematically showing the structure of an embodiment according to the present invention.
Figure 6:
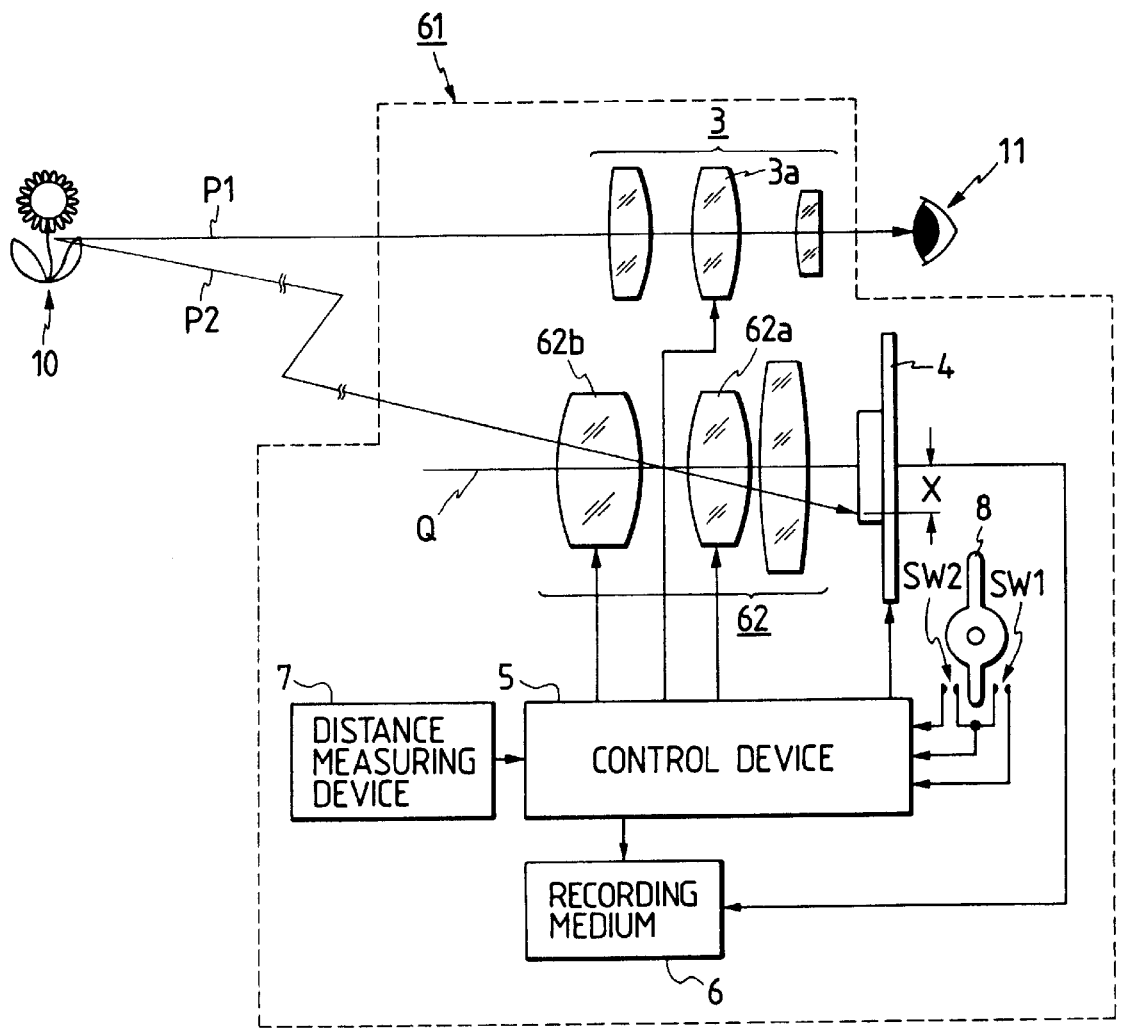
FIG. 6 is a view schematically showing the structure of an electronic camera according to the prior art.
Figure 7:
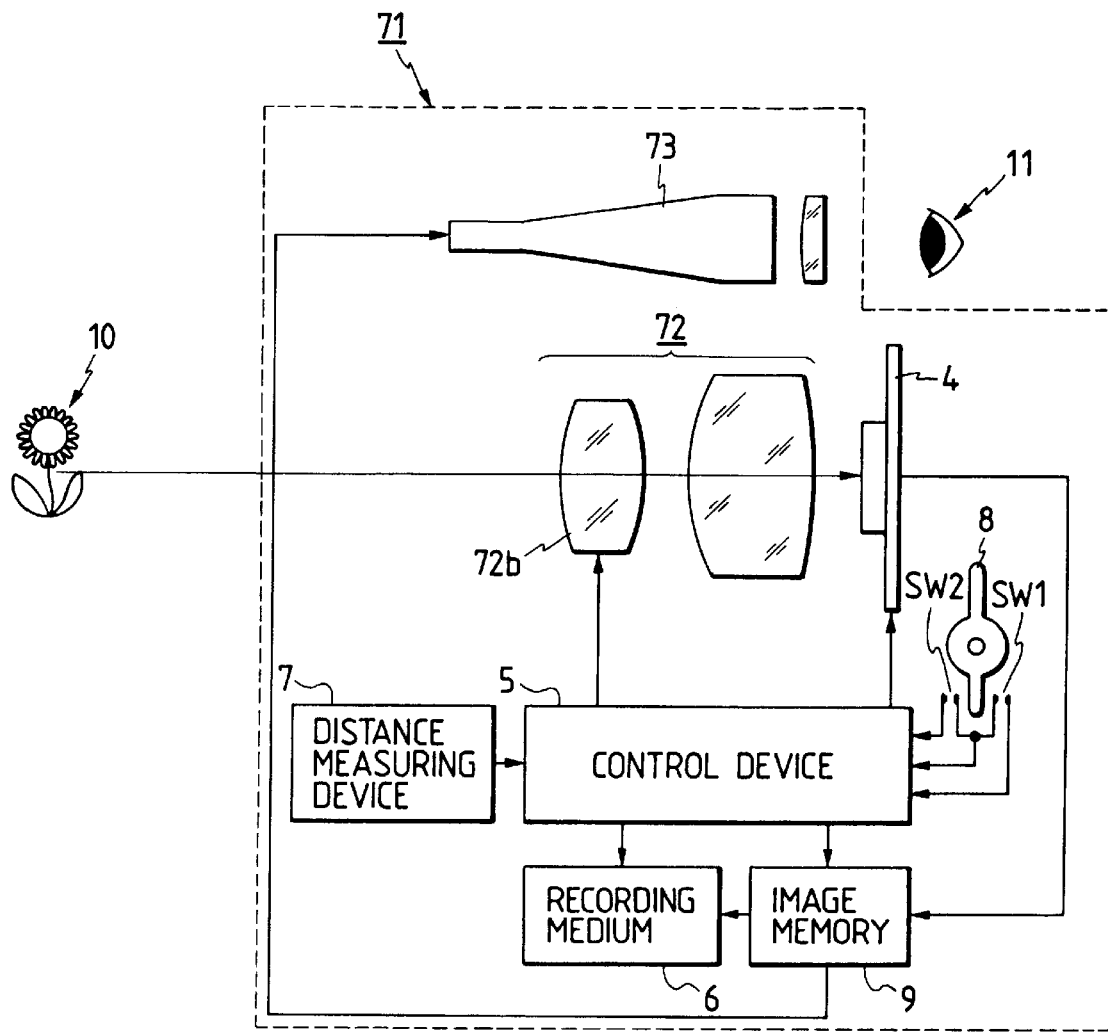
FIG. 7 is a view schematically showing the structure of an electronic camera according to the prior art.
Figure 8A:
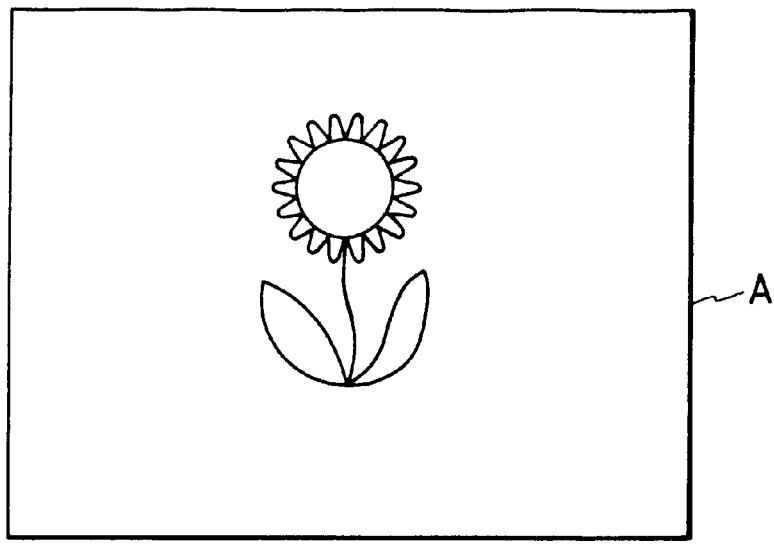
FIG. 8A is a view illustrating an image observable in the zoom finder of a conventional electronic camera.
Figure 8B:
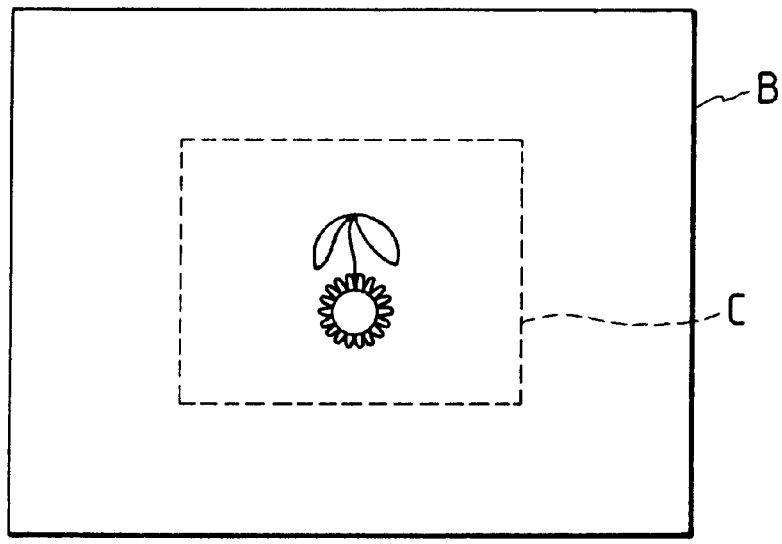
FIG. 8B is a view illustrating an image projected on an image sensor.

FIG. 1 to FIG. 4 are views illustrating a first embodiment according to the present invention. FIG. 1 is a view schematically showing the structure of an electronic camera according to the present embodiment. The same reference numbers are given to parts corresponding to those appearing in FIG. 6 and FIG. 7 where conventional electronic cameras are shown. Therefore, the description will focus on the difference from the conventional electronic cameras.

An electronic camera 1 according to the present embodiment is provided with an optical finder (zoom finder) 3 capable of varying its enlarging magnification. With the exception of this finder, it is provided, as in the electronic camera shown in FIG. 7 with an image sensor 4, a taking lens 2 which images the object image on the foregoing image sensor 4, a zooming lever 8 to change the photographing magnification, a metering device 7 to measure the distance to an object, an image memory 9 to store the image formed on the image sensor 4, a recording medium 6 to record the object image to be photographed, and a control device 5.

In photographing operation by this electronic camera, a photographer 11 observes an object 10 though the zoom finder 3 to operate the zooming lever 8 to obtain a desired photographing magnification. When this zooming lever 8 is held down to the left in FIG. 1, a switch SW1 is turned on. Then, a member 3a of the zoom finder 3 is driven by a driving device which is not shown and is shifted to enlarge the object image in a given field frame, thus causing the enlarging magnification to be increased.

When the zooming lever 8 is held down to the right in FIG. 1, a switch SW2 is turned on. Then, the member 3a of the zoom finder 3 is driven by a driving device which is not shown and shifted in the direction opposite to the foregoing operation to reduce the enlarging magnification of the zoom finder 3.

Subsequently, when the photographer 11 having obtained a desired object image in the finder 3 depresses a release button which is not shown, the distance to the object 10 is measured by the metering device 7. A member 2b of the optical system of the taking lens 2 is driven by a driving device (which is not shown) on the basis of the foregoing measured value of the distance to cause the object image to be focused on the image sensor 4. Thus, the image projected on the foregoing image sensor 4 is photoelectrically converted by the control device 5 to be inputted into the image memory 9 and recorded on the recording medium 6.

Figure 2A:
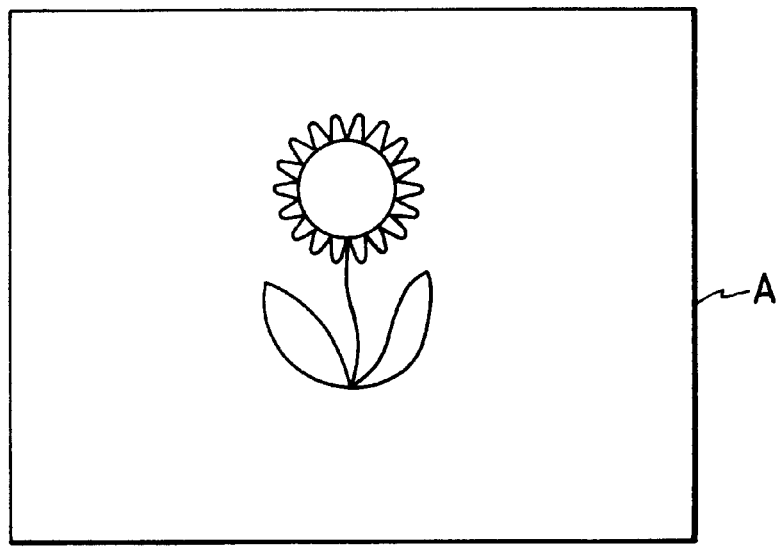
FIG. 2A is a view illustrating an image observable in a zoom finder.
Figure 2B:
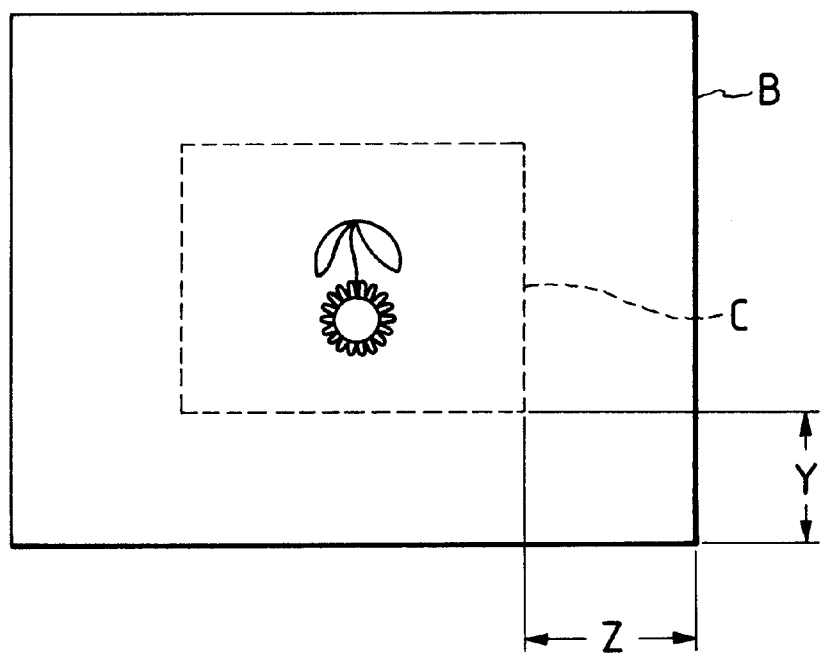
FIG. 2B is a view illustrating an image projected on an image sensor.

The object image observed by the photographer 11 in the finder 3 of this electronic camera 1, and the object image formed on the image sensor 4 for recording are shown in FIG. 2A and FIG. 2B. FIG. 2A is a view illustrating the image observable in the zoom finder 3. FIG. 2B is a view illustrating the image projected on the image sensor 4.

In this electronic camera, a part of the area C in the image B projected on the image sensor 4 is read in accordance with the enlarging magnification of the object image A observable in the zoom finder 3, and is recorded on the recording medium 6 in the form of an enlargement. The reading area C becomes smaller as the enlarging magnification of the zoom finder 3 becomes greater. Therefore, the object in the area C is further enlarged and recorded in the recording medium 6.

Referring to FIG. 1, if the photographing distance of the object (distance between the object and the camera) is comparatively long and an angle θ formed by the optical axis P1 of the zoom finder 3 and the central optical axis P2 passing the taking lens 2 is small, the object observable in the zoom finder 3 is imaged substantially in the center of the image sensor 4. However, if the photographing distance of an object is short and the aforesaid angle θ is large, the image which should be observable in the center of the zoom finder 3 is imaged in the direction opposite to the finder 3 (downward in FIG. 1) from the center of the image sensor 4. Thus, in the conventional electronic camera, the problem of parallax is encountered as described earlier.

Figure 3A:
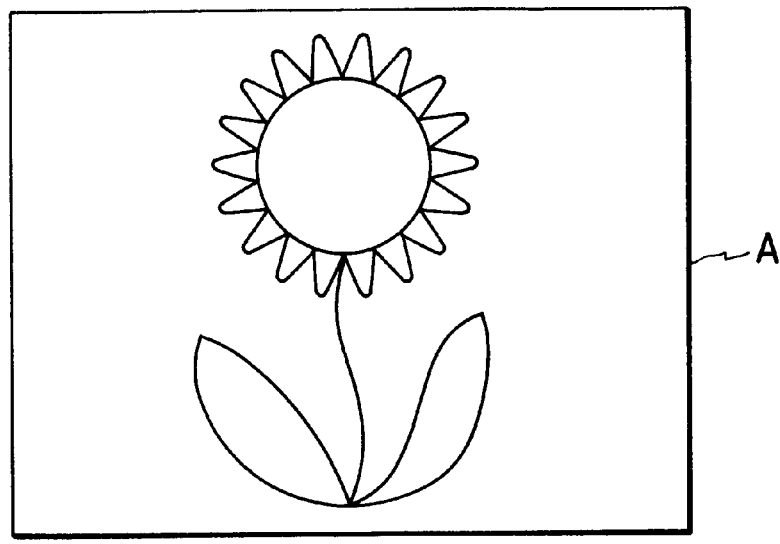
FIG. 3A is a view illustrating an image observable in a zoom finder.
Figure 3B:
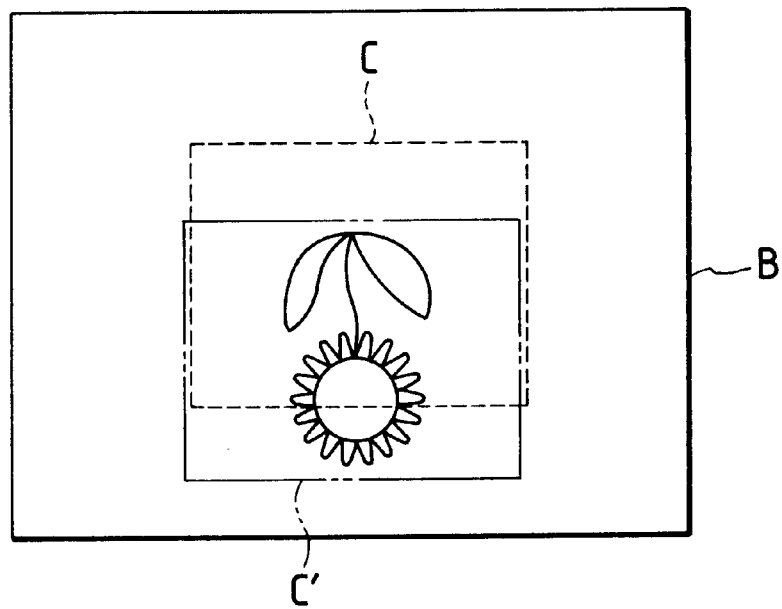
FIG. 3B is a view illustrating an image projected on an image sensor.

In the present electronic camera 1, however, such problem is solved as described below. Referring to FIG. 3B, an area C' which is displaced downward from the center of the image sensor is read, instead of the foregoing reading area C, and is enlarged and recorded in the recording medium. In this way, the same image as observed in the finder can be recorded on the recording medium.

Figure 4:
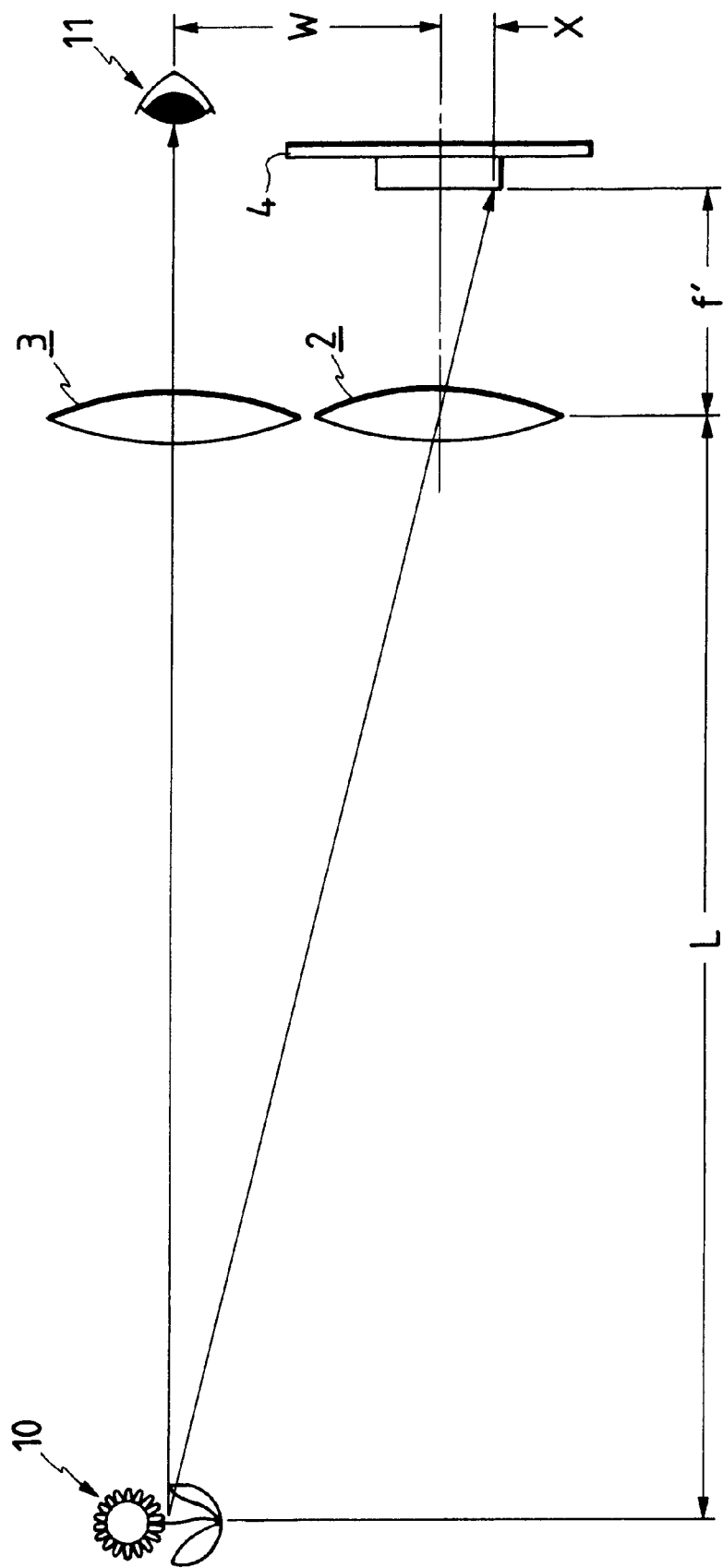
FIG. 4 is a view illustrating a method for calculating a correction amount of a reading area for an image sensor according to an embodiment of the present invention.

A correction amount for the reading area is calculated as described below. With reference to FIG. 4, W is a distance between the optical axis P1 of the zoom finder 3 and the optical axis P2 of the taking lens 2, L is a distance between the taking lens 2 and an object 10, f' is a distance between the taking lens 2 and the image sensor 4, and x is a distance between the image formation position of the object and the center of the image sensor. Here, given the focal length of the taking lens 2 as f, the following expression is formulated by the image formation formula of the lens:

$$1/L + 1/f' = 1/f \qquad (1)$$

Also, the following expression is formulated by the relationship of the geometrical similarity:

$$W/L = x/f' \qquad (2)$$

When these expressions (1) and (2) are solved for x, the following expression is obtained:

$$x = W/(L/f - 1) \qquad (3)$$

Thus, the displacement between the center of the image sensor and the image formation position of the object, that is, the correction amount x for the reading area, can be obtained according to this expression.

Therefore, if the foregoing reading area is displaced in the direction opposite to the finder by the distance x from the central point of the image sensor, it becomes possible to record the same image as observed in the finder on the recording medium. Thus, the aforesaid parallax problem can be solved.

If the photographer desires an image taking in a wide range and the zooming magnification is small, the reading area C becomes large so that the difference (at y in FIG. 2) between the reading area C and the light receiving area B of the image sensor is zero or smaller than x. In this case, it becomes impossible to displace the reading area by the distance x obtained by the foregoing expression (3). However, when an image is photographed in a wide range such as this, the ratio of the area occupied by the object image in the reading area C is so small that any parallax is insignificant. Therefore, there is essentially no problem.

Furthermore, in an electronic camera according to the present embodiment, the finder 3 and the taking lens 2 are arranged in the positions above and below in the vertical direction. Consequently, the structure is arranged so that the foregoing correction of the reading area C is made in the vertical direction. However, it is possible to arrange the finder 3 and the taking lens 2 in the horizontal direction. In such a case, the correction of the reading area C will be performed in the horizontal direction.

Also, in the present embodiment, while a zoom finder capable of varying the enlarging magnification continuously is used, it is possible to employ, in place of the foregoing finder, a finder of a plural-focus point type wherein several kinds of enlarging magnifications can be selected by switching over parts of the finder optical system.

Further, in the present embodiment, a taking lens of a fixed focal length type is used, but it is possible to construct a camera having a large zooming ratio by the use of a taking lens capable of varying its focal length thereby to enable the size of the reading area of an image to be varied electrically.

Figure 5:
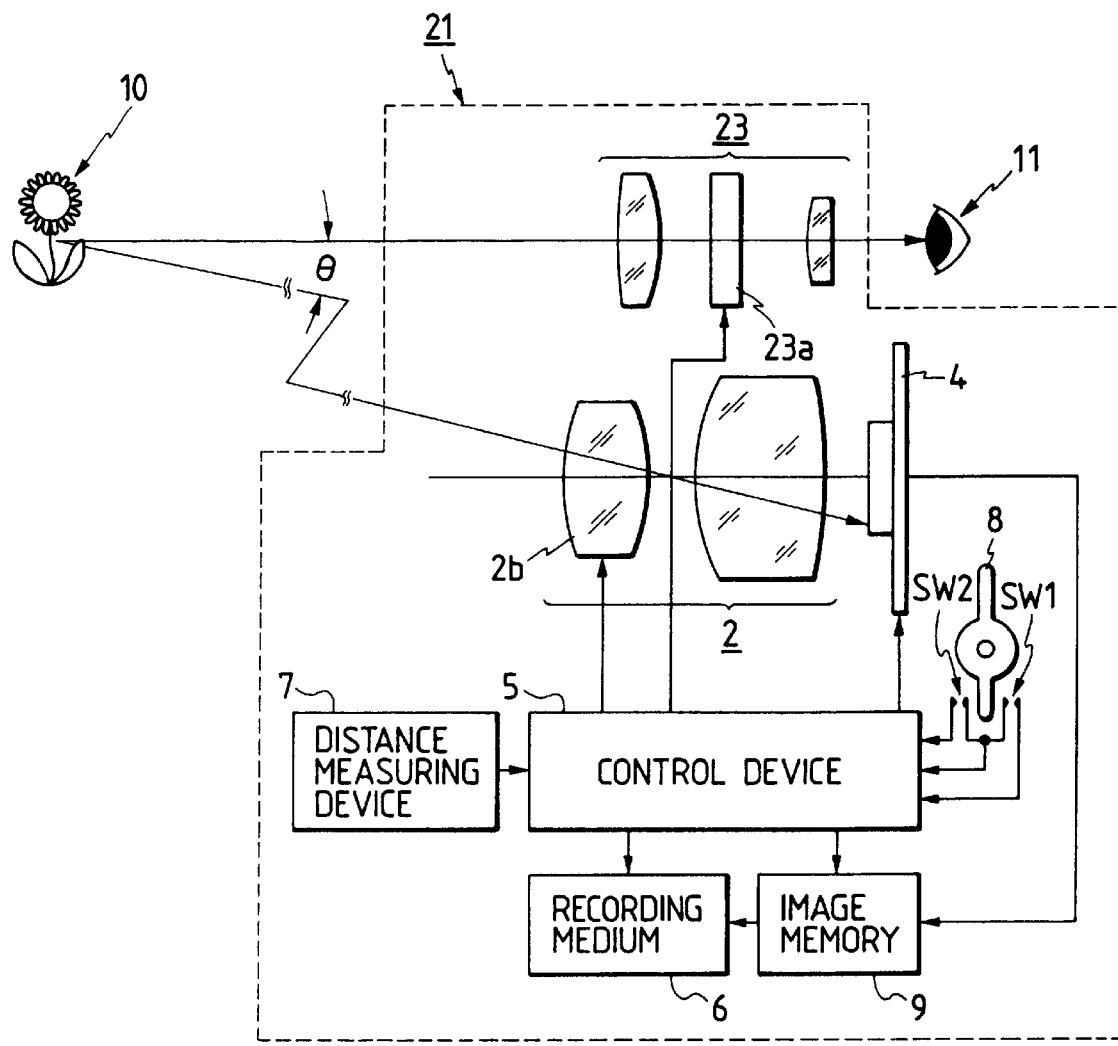
FIG. 5 is a view schematically showing the structure of another embodiment according to the present invention.

Another embodiment is shown in FIG. 5, and this embodiment is such that instead of the zoom finder 3 provided for the foregoing first embodiment, an optical finder 23 of a fixed magnification is employed, and that in the aforesaid finder 23, displaying means 23a is provided to display the photographing area by a variable frame in the finder. As is apparent in FIG. 5, the display control is responsive to operation of the zooming lever 8. In this electronic camera 21, an image is read from a part of the area of the image sensor 4 in accordance with the enlarging magnification displayed by the variable frame in the foregoing optical finder 23, and the aforesaid image is recorded on the recording medium 6.

Thus, since an optical finder of a fixed magnification type is used according to the present embodiment, it is possible to further reduce the manufacturing cost than with the foregoing first embodiment.

As described above, according to the present invention, there is no need for any mechanically interlocked mechanism for a finder and a taking lens. Thus, it is possible to implement the miniaturization of a camera, and to reduce manufacturing cost, and to prevent the generation of parallax.

What is claimed is:

1. An electronic camera having an image sensor to receive object light and to convert the light into electrical signals, comprising:
    changeable magnification optical finder through which an object is observed without an intervening phototaking lens;
    a finder magnification changing device which changes a magnification of said optical finder to change a viewing area of said optical finder;
    a reading device which reads electrical signals from said image sensor;
    a recording device which records signals read by said reading device; and
    a reading area modifying device which automatically corrects parallax by an operation that includes modifying a size and a center position of an area of said image sensor read by said reading device in accordance with the magnification of said optical finder, wherein said center position is modified relative to a predetermined position on the image sensor.

2. An electronic camera according to claim 1, wherein said finder magnification changing device is operated by an externally operable member.

3. An electronic camera according to claim 1, further comprising a measuring device which measures a distance between the object and the camera, and wherein said reading area modifying device modifies the size of said area and the center position of said area on said image sensor in accordance with the magnification of said optical finder and said distance measured by said measuring device.

4. An electronic camera having an image sensor to receive object light and to convert the light into electrical signals, comprising:
    an optical finder through which an object is observed without an intervening phototaking lens;
    a frame display which displays a phototaking frame in said optical finder;
    a frame changing device to change said phototaking frame;
    a reading device which reads electrical signals from said image sensor; and
    a reading area modifying device which automatically corrects parallax by an operation that includes modifying a size and a center position of an area of said image sensor read by said reading device in accordance with an area indicated by said phototaking frame, wherein said center position is modified relative to a predetermined position on the image sensor.

5. An electronic camera according to claim 4, wherein said frame changing device is operated by an externally operable member.

6. An electronic camera according to claim 4, wherein said frame changing device changes a position of said phototaking frame without changing a magnification of said optical finder.

7. An electronic camera according to claim 4, further comprising a distance measuring device which measures a distance between the object and the camera, and wherein said reading area modifying device modifies the size of said area and the center position of said area on said image sensor in accordance with the area indicated by said phototaking frame and the distance measured by said distance measuring device.

8. An electronic camera according to claim 7, wherein said frame changing device modifies a position of said phototaking frame without changing a magnification of said optical finder.

9. An electronic camera according to claim 4, wherein said optical finder has a fixed magnification.

10. An image recording method in an electronic camera having an optical finder for directly viewing an object without an intervening phototaking lens, comprising the steps of:
    operating an external member of the camera to change a phototaking area appearing in the optical finder to show less than a maximum field of view;
    operating an external release switch of the camera;
    upon operation of said release switch, imaging the object in a focused state on an electronic image sensor through a phototaking optical system of the camera;
    reading an image signal from the image sensor; and
    recording on a recording medium only a portion of the image signal corresponding to the phototaking area shown in the optical finder by automatically correcting parallax with an operation that includes changing a size and a center position of an area of the image sensor from which signals are recorded, in accordance with the phototaking area shown in the optical finder, wherein said center position is modified relative to a predetermined position on the image sensor.

11. An image recording method according to claim 10, wherein an image signal corresponding only to the phototaking area appearing in the optical finder is read from the image sensor.

12. An image recording method according to claim 10, wherein a magnification of the optical finder changes in response to the operation of said external member, and said portion of the image signal is determined based on the magnification of the optical finder.

13. An image recording method according to claim 10, wherein a size of a phototaking frame displayed in the optical finder changes in response to the operation of said external member, and said portion of the image signal is determined based on a size of said phototaking frame.

14. An electronic camera according to claim 1, further comprising a phototaking lens of fixed focal length to image the object on said image sensor.

15. An electronic camera according to claim 4, further comprising a phototaking lens of fixed focal length to image the object on said image sensor.

16. An image recording method according to claim 10, wherein the object is imaged on the image sensor by a phototaking lens of fixed focal length.

17. An electronic camera having an image sensor to receive object light to convert the light into electrical signals, comprising:
    a changeable magnification optical finder through which an object is observed without an intervening phototaking lens;
    a finder magnification changing device which changes a magnification of said optical finder;
    a reading device which reads signals from said image sensor;
    a recording device which records signals read from said image sensor; and
    a recording area modifying device which automatically corrects parallax by changing a center position of an area of said image sensor from which signals are recorded in said recording device, in accordance with the magnification of said optical finder, wherein said center position is modified relative to a predetermined position on the image sensor.

18. An electronic camera according to claim 17, further comprising a phototaking lens of fixed focal length to image the object on said image sensor.

19. An electronic camera having an image sensor to receive object light and to convert the light into electrical signals, comprising:
    an optical finder through which an object is observed without an intervening phototaking lens;
    a frame display which displays a phototaking frame in said optical finder;
    a frame changing device to change said phototaking frame;
    a reading device which reads electrical signals from said image sensor; and
    a recording area modifying device which automatically corrects parallax by changing a center position of an area of said image sensor from which signals are recorded in said recording device, in accordance with an area indicated by said phototaking frame, wherein said center position is modified relative to a predetermined position on the image sensor.

20. An electronic camera according to claim 19, further comprising a phototaking lens of fixed focal length to image the object on said image sensor.

21. An electronic camera having an image sensor to receive object light and to convert the light into electrical signals, comprising:
    an optical finder through which an object is observed without an intervening phototaking lens;
    a distance information detecting device which detects object distance information;
    a reading device which reads electrical signals from said image sensor;
    a recording device which records signals read by said reading device; and
    a reading area modifying device which automatically corrects parallax by modifying a center position of an area of said image sensor read by said reading device, wherein said center position is modified relative to a predetermined position on the image sensor, in accordance with the distance information from said distance information detecting device.

22. An electronic camera having an image sensor to receive object light and to convert the light into electrical signals, comprising:
    an optical finder through which an object is observed without an intervening phototaking lens;
    a field angle changing member provided on a body of the camera;
    a reading device which reads electrical signals from said image sensor;
    a recording device which records signals read by said reading device;
    a reading area modifying device which automatically corrects parallax by modifying a center position of an area of said image sensor read by said reading device in accordance with an operation of said field angle changing member, wherein said center position is modified relative to a predetermined position on the image sensor.

* * * * *